US008877029B2

(12) United States Patent
Peffer et al.

(10) Patent No.: US 8,877,029 B2
(45) Date of Patent: Nov. 4, 2014

(54) ELECTRODEPOSITION COATINGS INCLUDING A LANTHANIDE SERIES ELEMENT FOR USE OVER ALUMINUM SUBSTRATES

(75) Inventors: Robin M. Peffer, Valencia, PA (US); Edward F. Rakiewicz, Gibsonia, PA (US); Michael J. Pawlik, Glenshaw, PA (US); Michelle S. Miles, Mercer, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 176 days.

(21) Appl. No.: 12/876,591

(22) Filed: Sep. 7, 2010

(65) Prior Publication Data

US 2011/0008625 A1    Jan. 13, 2011

Related U.S. Application Data

(63) Continuation-in-part of application No. 11/839,127, filed on Aug. 15, 2007.

(51) Int. Cl.
*C25D 13/10* (2006.01)

(52) U.S. Cl.
USPC .......................... 204/486; 204/492; 523/415

(58) Field of Classification Search
USPC ................... 204/492, 495; 523/415
See application file for complete search history.

(56) References Cited

U.S. PATENT DOCUMENTS

| | | | |
|---|---|---|---|
| 4,434,256 A | 2/1984 | Dworak et al. | |
| 4,829,105 A | 5/1989 | Yamada et al. | |
| 5,250,325 A | 10/1993 | Phillips et al. | |
| 5,277,709 A | 1/1994 | Armstrong et al. | |
| 5,298,148 A * | 3/1994 | Yasuoka et al. | 205/50 |
| 5,344,858 A | 9/1994 | Hart et al. | |
| 5,756,638 A | 5/1998 | von Gentzkow et al. | |
| 6,168,868 B1 * | 1/2001 | Hauser et al. | 428/457 |
| 6,248,225 B1 | 6/2001 | Palaika et al. | |
| 6,271,377 B1 * | 8/2001 | Galbo et al. | 546/14 |
| 6,312,812 B1 | 11/2001 | Hauser et al. | |
| 6,479,151 B2 | 11/2002 | Buter et al. | |
| 6,818,116 B2 | 11/2004 | Stoffer | |
| 7,241,371 B2 | 7/2007 | Stoffer | |
| 7,494,716 B2 * | 2/2009 | Ehmann et al. | 428/418 |
| 7,497,935 B2 * | 3/2009 | McCollum et al. | 204/489 |
| 7,759,419 B2 | 7/2010 | Stoffer | |
| 2003/0004231 A1 | 1/2003 | Ehmann et al. | |
| 2004/0050704 A1 * | 3/2004 | Rakiewicz et al. | 204/489 |
| 2004/0079647 A1 | 4/2004 | Warburton et al. | |
| 2004/0249043 A1 | 12/2004 | Stoffer et al. | |
| 2005/0215670 A1 | 9/2005 | Shimasaki et al. | |
| 2006/0113007 A1 | 6/2006 | Morris | |
| 2007/0048550 A1 | 3/2007 | Millero et al. | |
| 2008/0090069 A1 | 4/2008 | Walters | |
| 2009/0045071 A1 | 2/2009 | Valko et al. | |
| 2009/0065101 A1 | 3/2009 | Morris | |

FOREIGN PATENT DOCUMENTS

| | | |
|---|---|---|
| CA | 2719044 A1 | 9/2009 |
| EP | 0174628 | 12/1991 |
| EP | 0469491 | 1/1995 |
| EP | 1213334 A1 | 6/2002 |
| EP | 1319033 | 4/2007 |
| JP | 2001252615 | 9/2001 |
| RU | 2129570 | 4/1999 |
| RU | 2282648 | 8/2006 |
| WO | 91/19837 | 12/1991 |
| WO | 0023529 A1 | 4/2000 |
| WO | 00/32351 | 6/2000 |
| WO | 01/46495 | 6/2001 |
| WO | 0144382 A1 | 6/2001 |
| WO | 2004/003086 | 1/2004 |
| WO | 2005005559 A1 | 1/2005 |
| WO | 2007025297 A2 | 3/2007 |
| WO | 2009023687 A1 | 2/2009 |

\* cited by examiner

*Primary Examiner* — Kishor Mayekar
(74) *Attorney, Agent, or Firm* — Alicia M. Passerin

(57) ABSTRACT

A process for applying a coating on aluminum substrates by anionic or cationic electrodeposition of an electrodeposition coating including an aqueous dispersion of one or more lanthanide series elements having a +3/+4 oxidation state and phosphated epoxy resin made by phosphating a polyepoxide with both phosphoric acid and an organophosphonic acid and/or an organophosphinic acid. The coating has a reduced tendency to form pinholes.

24 Claims, No Drawings

ELECTRODEPOSITION COATINGS INCLUDING A LANTHANIDE SERIES ELEMENT FOR USE OVER ALUMINUM SUBSTRATES

CROSS-REFERENCE TO RELATED APPLICATIONS

This application is a continuation-in-part of U.S. patent application Ser. No. 11/839,127 filed Aug. 15, 2007 and is being incorporated herein by reference.

STATEMENT REGARDING FEDERALLY SPONSORED RESEARCH

This invention was made with Government support under Contract No. FA8650-05-C-5010 awarded by the United States Air Force. The United States Government may have certain rights in this invention.

FIELD OF THE INVENTION

The present invention relates to the use of electrodeposition to provide coatings on aluminum substrates in which the coating has an improved appearance.

BACKGROUND OF THE INVENTION

Aluminum is the metal most prominently used in aircraft assembly. Structural joints of aircraft are adhesively bound together. However, many adhesives do not adhere well to the aluminum substrate. To improve the adhesive strength in the joint areas, it is known to apply an electrodeposition coating to the aluminum substrate. A preferred coating in this regard is derived from a phosphated epoxy resin that is prepared by reacting an epoxy resin such as polyglycidyl ether of a polyphenol with phosphoric acid. The coating is applied by anionic electrodeposition and adheres very well to aluminum substrates and to subsequently applied adhesives. One problem with the electrodeposition coating is the formation of pinholes in the coating which give a rough coating with poor appearance. Also, the pinholes can be a point of failure in the coating.

SUMMARY OF THE INVENTION

The present invention overcomes the above problem by using a phosphated epoxy resin that is obtained by reacting one or more epoxy resins with phosphoric acid and with an organophosphonic acid and/or an organophosphinic acid in combination with one or more lanthanide series elements which have both common oxidation states of +3 and +4, referred hereinafter as +3/+4 oxidation states.

More specifically, the invention provides a process for providing a coating on aluminum substrates by passing an electric current between the substrate acting as an anode and a cathode in electrical contact with an electrodeposition bath containing an aqueous dispersion of a base-neutralized ungelled phosphate epoxy resin and a lanthanide series element having a +3 and/or a +4 oxidation state.

The exemplary embodiments also provide an aqueous dispersion of a base-neutralized ungelled phosphate epoxy resin and a lanthanide series element having a +3 and/or a +4 oxidation state.

DETAILED DESCRIPTION

The phosphated epoxy resins useful herein are ungelled and typically are prepared as follows. An epoxy-containing material, such as a polyepoxide is reacted with a phosphorus acid such as a phosphoric acid or an equivalent thereof. The polyepoxide useful herein can be a compound or a mixture of compounds having more than 1.0 epoxy groups per molecule. Several polyepoxides are known in the art. Examples of the polyepoxides can be found in the Handbook of Epoxy Resins, Lee and Neville, 1967, McGraw-Hill Book Company.

A preferred class of polyepoxides is the polyglycidyl ethers of polyphenols, such as bisphenol A. These are produced by etherification of a polyphenol with an epichlorohydrin in the presence of an alkali. The phenolic compound can be 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl) propane; bis(2-hydroxynaphthyl)methane; 1,5-dihydroxynaphthalene; and 1,1-bis(4-hydroxy-3-allylphenyl)ethane. Another useful class of polyepoxides is produced similarly from polyphenol resins.

In addition to the polyepoxides described above, there can also be employed additional polymerization polymers containing pendant epoxy groups. These polymers are made by copolymerizing a variety of polymerizable ethylenically unsaturated monomers at least one of which is an epoxy containing monomer, e.g., glycidyl acrylate or glycidyl methacrylate.

A suitable ethylenically unsaturated monomer that does not contain a group that is reactive with the epoxy group can be employed herein as a comonomer. The preferred monomers include alpha, beta-ethylenically unsaturated monomers, e.g., unsaturated carboxylic acid esters of saturated alcohols containing from 1 to about 8 carbon atoms, and monovinyl aromatic monomers such as styrene and vinyl toluene.

The preferred polyepoxides have epoxy equivalent weight of about 172 to 5000 and preferably 300 to 1000.

In addition to the polyepoxides, the reaction mixture can contain a monomeric monoepoxide such as monoglycidyl ethers of alcohols and phenols, such as phenyl glycidyl ether, and glycidyl esters of monocarboxylic acids such as glycidyl neodecanoate.

The phosphoric acid that is reacted with the epoxy-containing material can be a 100 percent orthophosphoric acid or a phosphoric acid aqueous solution. Other forms of phosphoric acid such as superphosphoric acid, diphosphoric acid and triphosphoric acid can be employed herein. Also, the polymeric or partial anhydrides of phosphoric acids can be employed. Typically, aqueous phosphoric acids that are of about 70 to 90 weight percent and preferably about 85 weight percent phosphoric acid are employed.

In addition to the phosphoric acid, phosphonic acids or phosphinic acids are also reacted with the epoxy-containing material. Examples of phosphonic acids are organophosphonic acids of the structure:

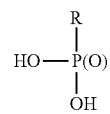

wherein R is organic radical such as those having a total of 1-30, such as 6-18 carbons. R can be aliphatic, aromatic or mixed aliphatic/aromatic and can be an unsubstituted hydrocarbon or a substituted hydrocarbon.

Examples of phosphinic acids are organophosphinic acids of the structure:

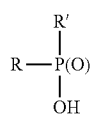

wherein preferably, R and R' are each independently hydrogen or organic radicals. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Representative of the organophosphonic acids are as follows: 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid.

The reaction of the polyepoxide with the phosphorus acids is typically conducted in organic solvent by mixing the polyepoxide with a mixture of phosphorus acid and the organophosphonic acid and/or the organophosphinic acid and heating optionally in the presence of catalyst such as an onium salt at elevated temperature for 30 to 90 minutes to complete the reaction. The relative amounts of the polyepoxide and the phosphorus acids that are reacted with one another are often as follows: for each equivalent of epoxy, there are 0.1 to 0.8 moles of phosphoric acid and from 0.01 to 0.4 moles of organophosphonic and/or organophosphinic acid with the molar ratio of phosphoric to organophosphonic and/or organophosphinic acid being within the range of 1:0.01 to 0.5. The epoxy-phosphorus acid reaction products typically have an acid value of 10 to 60, preferably 15 to 50 based on resin solids.

Besides reacting the epoxy-containing material with a mixture of phosphoric acid and the organophosphonic and/or organophosphinic acid, the polyepoxide can be reacted separately with the phosphoric acid and with either or both of the organophosphonic acid and the organophosphinic acid. The various reaction products can then be combined.

The phosphated epoxy resin is typically used with a curing agent such as an aminoplast or a phenolplast resin. The useful aminoplast resins of this invention are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are preferred herein.

Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

The relative amounts of the (a) phosphated epoxy resin and (b) curing agent is from 50 to 90, preferably 60 to 75 percent by weight phosphated epoxy resin, and from 10 to 50, preferably 25 to 40 percent by weight curing agent based on solids weight of (a) and (b).

In the present invention the aqueous dispersion of a base-neutralized resinous composition includes the aforementioned ungelled phosphated epoxy resin and a lanthanide series element having a +3/+4 oxidation state and may also include the curing agent. The relative amount of the lanthanide element in the aqueous dispersion may be between 0.015 and 3.2 wt. percent, and more preferably may be between about 0.1 and 2.1 wt. percent, and most preferably may be between about 0.3 and 1.05 wt. percent, based on total resin solids.

The term "lanthanide element", as described herein, includes both elemental versions of the lanthanide series elements, as well as their corresponding lanthanide oxides.

In an exemplary embodiment, the lanthanide series element comprises cerium. The relative amount of cerium in the aqueous dispersion may be between 0.015 and 1.5 wt. percent, and more preferably may be between about 0.1 and 1.0 wt. percent, and most preferably may be between about 0.3 and 0.5 wt. percent, based on total resin solids.

In another exemplary embodiment, the lanthanide series element comprises praseodymium. The relative amount of praseodymium in the aqueous dispersion may be between 0.03 and 3.2 wt. percent, and more preferably may be between about 0.2 and 2.1 wt. percent, and most preferably may be between about 0.6 and 1.05 wt. percent, based on total resin solids.

In another exemplary embodiment, the lanthanide series element comprises terbium. The relative amount of terbium in the aqueous dispersion may be between 0.02 and 2.5 wt. percent, and more preferably may be between about 0.025 and 1.5 wt. percent, and most preferably may be between about 0.4 and 0.7 wt. percent, based on total resin solids.

In still another exemplary embodiment, a combination of lanthanide series elements having +3/+4 oxidation states may be used. The relative amount of combinations of lanthanide elements having +3/+4 oxidation states in the aqueous dispersion may be between 0.015 and 3.2 wt. percent, and more preferably may be between about 0.1 and 2.1 wt. percent, and most preferably may be between about 0.3 and 1.05 wt. percent, based on total resin solids.

In yet another exemplary embodiment, the combination of lanthanide elements having +3/+4 oxidation states as in the previous paragraph may include mixtures of two or more of cerium, praseodymium and terbium in the aqueous dispersion may be between 0.015 and 3.2 wt. percent, and more preferably may be between about 0.1 and 2.1 wt. percent, and most preferably may be between about 0.3 and 1.05 wt. percent, based on total resin solids.

In preparing the low temperature curable composition of the invention, the above ingredients can be admixed in water in any convenient manner. Typical coating additives such as pigments, fillers, corrosion inhibitors, anti-oxidants, flow control agents, surfactants and the like can be employed herein.

In certain embodiments, suitable corrosion inhibitors that may be used in the electrodepositable coating composition comprise a nitrogen-containing heterocyclic compound. Examples of such compounds, which are suitable for use in the present invention, are azoles (that is, 5-membered N-heterocyclic compounds that contain in the heterocyclic ring two double bonds, one or more carbon atoms and optionally a sulfur atom), oxazoles, thiazoles, thiazolines, imidazoles, diazoles, pyridines, indolizines, and triazines, tetrazoles, tolutriazole, or mixtures thereof. Suitable triazoles include, for example, 1,2,3-triazole, 1,2,4-triazole, benzotriazole, and their derivatives, or combinations thereof. Derivatives of 1,2, 3-triazole, which are suitable for use in the present invention, include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole aldehyde, 2-methyl-1,2,3-triazole-4-carboxylic acid, and 4-cyano-1,2,3-triazole, or combinations thereof. Derivatives of 1,2,4-triazole, which are suitable for use in the present invention, include 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one, 1-phenylurazole, or combinations thereof. Suitable examples of diazoles and thiazole could include 2-mercaptobenzothiazole, 2,5-dimercapto-1,3,4 thiadiazole and derivatives, or combinations thereof. Derivatives of benzotriazole, which are suitable for use in the present invention, include 1-methylbenzotriazole, 5-methyl benzotriazole, 5,6-dimethylbenzotriazole, 2-phenylbenzotriazole, 1-hydroxybenzotriazole, methyl 1-benzotriazolecarboxylate, 2-(3',5'-dibutyl-2'-hydroxyphenyl)benzotriazole, or combinations thereof. One exemplary thiazole is 2-amino thiazole. In certain embodiments, the amount of azole compound present in the electrodepositable coating composition is ≥0.5 weight % based on the total resin solids of the electrodepositable coating composition. In some embodiments, the amount of azole compound present in the electrodepositable coating composition is ≤5 weight % based on the total resin solids of the electrodepositable coating composition. In certain embodiments, the amount of azole compound present in the electrodepositable coating composition ranges between any combinations of values, which were recited in the preceding sentences, inclusive of the recited values. Typically, the azole is present in the aqueous dispersion in amounts as low as 0.001 percent, such as 0.001 to 1% by weight based on total weight of the aqueous dispersion. In other embodiments, the azole compound is present from 2 weight % to 4 weight % based on the total resin solids of the electrodepositable coating composition.

In adapting the resinous composition to be a water-based and electrophoretic composition, it is neutralized with a base. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. The percent of neutralization is such as would make the resinous blends water-dispersible and electrophoretic. Typically, the resinous blend is at least partially neutralized from about 40 to 150 percent and preferably 60 to 120 percent neutralization.

The electrodepositable compositions of this invention typically have a solids content of 5 to 25 percent and preferably 5 to 15 percent. In general, the electrodeposition bath has an operating bath conductivity within 200 to 3000 micromhos per centimeter and preferably within the range of 500 to 1500 micromhos per centimeter. The residence time of the aluminum substrate being coated in the bath is, in general, from about 90 to 120 seconds. The aluminum substrates can optionally be pretreated with a corrosion-inhibiting treatment as long as the substrate maintains its electrical conductivity.

As stated above, the present invention may also be directed to a method of coating a substrate, such as an aluminum substrate, with a non-chrome coating system. Unlike other methods of coating an aluminum substrate, the method disclosed herein does not require the use of any materials (e.g., cleaners, water, conversion coatings, electrodepositable coating compositions) that contain chrome. Accordingly, in certain embodiments, the materials used in one or more of the steps described below can be substantially chrome free. As used herein, "substantially chrome free" means that chrome is not intentionally added to the material by the user. For example, in some embodiments, all the materials used in the steps described below are substantially chrome free. In other embodiments, one or more of the materials used in the steps below (e.g., the conversion coating and/or the electrodepositable coating composition) are substantially chrome free while other materials used in other steps (e.g., the acid cleaner) may contain chrome. For purposes of this disclosure, the materials used in the method described below beginning in the next paragraph may be applied onto the substrate using techniques known in the art such as spray and/or immersion techniques.

The method may begin by applying a caustic cleaner onto at least a portion of a substrate. The caustic cleaner is often used to remove oil and/or other contaminants (e.g., dirt or dust), which can be deposited onto the surface of the substrate during a forming and/or stamping process. The caustic cleaner that may be used in the present invention can be, for example, any silicate and/or non-silicated caustic cleaners known in the art. Suitable silicated and/or non-silicated caustic cleaners include METALAST CLEANER 1000 (commercially available from METALAST International, Inc.), RIDOLENE 298 (commercially available from HENKEL), CHEMKLEEN 275 (commercially available from PPG Industries, Inc.), or combinations thereof.

At least of a portion of the substrate that was subjected to caustic cleaning may undergo a water rinse in order to wash at least a portion of the caustic cleaner from the surface of the substrate.

In the present methods, an acid cleaner may optionally be applied onto at least a portion of the substrate. The acid cleaner is often applied onto the surface in order to etch the surface of the substrate. In certain embodiments, the acid cleaner is used to deoxidize the surface of the substrate (e.g., remove the oxide layer found on the surface of the substrate) in order to promote the uniform deposition of a conversion coating, which is described below, as well as to promote the adhesion of the conversion coating to the substrate. Suitable acid cleaners that may be used in the method disclosed herein include, without limitation, phosphoric acid, sulfuric acid, nitric acid, hydrofluoric acid, LNC DEOXIDIZER (commercially available from Oakite), TURCO DEOXIDIZER 6 (commercially available from Henkel), or combinations thereof.

After such an acid cleaning, the substrate may undergo a water rinse, in order to wash at least a portion of the acid cleaner from the surface of the substrate.

In the present methods, a conversion coating composition (pretreatment coating composition) comprising a Group IIIB or Group IVB metal compound such as zirconium is often deposited onto at least a portion of the substrate. In some embodiments, the conversion coating comprises a pretreatment bath that comprises 10 parts per million (ppm) to 10,000 ppm of zirconium based on the total weight of the pretreatment bath. In certain embodiments, the conversion coating composition can further comprise chrome. Traditional chrome containing (non-zirconium containing) conversion coatings, which are known in the art, may also be used in the present invention. Examples of such traditional chrome containing conversion coatings include ALODINE 1200S (commercially available from Henkel) and/or METLAST TCP-HF (commercially available from Metalast International Inc.).

Alternatively, in some embodiments, in lieu of the application of the conversion coating described in the previous paragraph, the surface of the substrate can be anodized using techniques known in the art.

After such deposition of a conversion coating, at least of a portion of the substrate may undergo a water rinse, in order to wash at least a portion of excess conversion coating composition from the surface of the substrate.

In the methods of the present invention, an electrodepositable coating composition, which comprises the electrodeposition bath containing the aqueous dispersion of the base-neutralized resinous composition containing one or more lanthanide elements having a +3/+4 oxidation state and the ungelled phosphated epoxy resin and which may also include the curing agent as described above, is deposited onto at least a portion of the substrate onto which the conversion coating may have been deposited using techniques known in the art such as anodic or cathodic electrodeposition. The electrodepositable coating composition may also comprise one or more coating additives, including one or more corrosion inhibitors, as described above.

In some embodiments, the acid cleaner, conversion coating, and electrodepositable coating composition described in the method of the previous paragraphs are substantially free of chrome.

After electrocoating, the substrate is removed and then baked in an oven at a temperature and over a period sufficient to effect cure at a low temperature. Generally, the coated substrate is baked at temperatures of about 225° F. or lower and more preferably 200° F. or lower for about 20-60 minutes. Typically the substrates can be cured at 180° F. for 20 minutes to produce hard, solvent resistant and non-tacky films. If desired, the electrocoated substrates can be baked at higher temperatures of, say, 350° F.

These and other aspects of the claimed invention are further illustrated by the following non-limiting examples.

Substrate with a Coating System

The method described above can be used on a variety of substrates. Suitable substrates that can be used with the present invention include metal substrates, metal alloy substrates, and/or substrates that have been metallized, such as nickel plated plastic. In some embodiments, the metal or metal alloy can be steel and/or aluminum. For example, the steel substrate could be cold rolled steel, electrogalvanized steel, and/or hot dipped galvanized steel. Aluminum alloys of the 2XXX, 5XXX, 6XXX, or 7XXX series as well as clad aluminum alloys may also be used as the substrate. The substrate used in the present invention may also comprise titanium and/or titanium alloys. In some embodiments, the substrate may comprise a portion of a vehicle such as a vehicular body (e.g., without limitation, door, body panel, trunk deck lid, roof panel, hood, roof and/or stringers, rivets, landing gear components, and/or skins used on an aircraft) and/or a vehicular frame. As used herein, "vehicle" or variations thereof includes, but is not limited to, civilian, commercial and military aircraft, and/or land vehicles such as cars, motorcycles, and/or trucks.

The various coating compositions described herein may be applied as part of a coating system that can be deposited onto the substrate. The coating system typically comprises a number of coating layers. A coating layer is usually formed when a coating composition (e.g., a primer-surfacer, color imparting, and/or substantially clear coating composition; described further below) that is deposited onto the substrate is substantially cured or dried by methods known in the art (e.g., by thermal heating.

Depending on the industry (e.g., aerospace or automotive), various coating layers, such as a primer-surfacer layer or a color imparting coating layer, may be applied onto at least a portion of the electrodepositable coating layer. For example, in the aerospace industry, a color imparting coating layer, such as DESOPHANE (commercially available from PPG Industries, Inc.), is deposited onto at least a portion of the electrodepositable coating layer. In certain embodiments, a primer layer, such as DESOPRIME (commercially available from PPG Industries, Inc.), is disposed between the electrodepositable coating layer and the color imparting coating layer.

In a conventional coating system used in the automotive industry, a primer-surfacer layer, such as DPX-1791, DPX-1804, DSPX-1537, GPXH-5379, OPP-2645, PCV-70118, and 1177-225A (available from PPG Industries, Inc.) is typically deposited onto at least a portion of the electrodepositable coating layer. The primer-surfacer coating layer serves to enhance chip resistance of subsequently applied coating layers (e.g., color imparting coating composition and/or substantially clear coating composition) as well as to aid in the appearance of the subsequently applied layers. As used herein, "primer-surfacer" refers to a primer composition for use under a subsequently applied coating composition, and includes such materials as thermoplastic and/or crosslinking (e.g., thermosetting) film-forming resins generally known in the art of organic coating compositions.

It should be noted that in some embodiments, the primer-surfacer coating layer is not used in the coating system. Therefore, a color imparting coating layer can be deposited onto at least a portion of the electrodepositable coating layer.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing). In some embodiments, the coating composition comprising the polymer described herein can be used as the clearcoat coating composition.

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in U.S. Patent Application Publication 2005-0287348, filed Jun. 24, 2004, U.S. Provisional Application No. 60/482,167, filed Jun. 24, 2003, and U.S. patent application Ser. No. 11/337,062, filed Jan. 20, 2006.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, one or more of the uncured coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures ≥10° C. In other embodiments, the curing operation can be carried out at temperature ≤246° C. In certain embodiments, the curing operation can carried out at temperatures ranging between any combinations of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, the coating compositions described herein are low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be ≤125 microns, such as ≤80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Bath Composition Used in Example I

Resin I: Phosphated Epoxy Resin Dispersion Preparation

A mixture of 819.2 parts of bisphenol A diglycidyl ether (EEW 188), 263.5 parts of bisphenol A, and 116.4 parts of 2-n-butoxy-1-ethanol and 93.1 parts 2-ethyl-1-hexanol was heated to 115° C. At that point, 0.8 parts of ethyl triphenylphosphonium iodide was added. This mixture was heated and held at a temperature of at least 165° C. for one hour. As the mixture was allowed to cool to 88° C., 58.2 parts of EKTASOLVE EEH solvent and 23.2 parts of 2-ethyl-1-hexanol were added. At 88° C., a slurry consisting of 32.1 parts of 85% o-phosphoric acid, 18.9 parts phenylphosphonic acid, and 6.9 parts of EKTASOLVE EEH was added. The reaction mixture was subsequently maintained at a temperature of at least 120° C. for 30 minutes. At that point, the mixture was cooled to 100° C. and 71.5 parts of deionized water was gradually added. Once the water was added, a temperature of about 100° C. was maintained for 2 hours. Then the reaction mixture was cooled to 90° C. and 90.0 parts of diisopropanolamine was added, followed by 413.0 parts of CYMEL 1130 and 3.0 parts of deionized water. After 30 minutes of mixing, 1700.0 parts of this mixture was reverse-thinned into 1422.3 parts of agitated deionized water. An additional 328.7 parts of deionized water was added to yield a homogeneous dispersion which evidenced a solids content of 38% after 1 hour at 110° C.

| The electrodeposition bath was prepared as follows: | |
| --- | --- |
| Ingredients | Parts by Weight |
| Resin I - Phosphated epoxy resin dispersion | 1428 |
| Ethylene glycol monohexyl ether | 39 |
| Eastman Optifilm 400 | 24 |
| Tetronic 150R1 | 0.6 |
| Pigment paste[1] | 304 |
| Deionized water | 1804 |

[1]Grey pigment paste, ACPP-1120, available from PPG Industries, Inc., 50% solids.

The above ingredients were thoroughly blended to produce a resinous blend having a solids content of 20% with a pigment/binder ratio of 0.2.

Bath Composition Used in Example II

Resin II: Phosphated Epoxy Resin Dispersion Preparation

A mixture of 794.5 parts of bisphenol A diglycidyl ether (EEW 188), 255.6 parts of bisphenol A, 112.8 parts of 2-n-butoxy-1-ethanol and 90.3 parts 2-ethyl-1-hexanol was heated to 115° C. At that point, 0.8 parts of ethyl triphenylphosphonium iodide was added. This mixture was heated and held at a temperature of at least 165° C. for one hour. As the mixture was allowed to cool to 90° C., 109.9 parts of EKTASOLVE EEH solvent and 22.5 parts of 2-ethyl-1-hexanol were added. At 88° C., 18.4 parts Rhodite 19A, available from Universal Photonics Incorporated, was added followed by 37.9 parts of 85% o-phosphoric acid. The reaction mixture was subsequently maintained at a temperature of at least 120° C. for 30 minutes. At that point, the mixture was cooled to 100° C. and 69.4 parts of deionized water was gradually added. Once the water was added, a temperature of about 100° C. was maintained for 2 hours. Then the reaction mixture was cooled to 90° C. and 87.3 parts of diisopropanolamine was added, followed by 400.6 parts of CYMEL 1130. After 30 minutes of mixing, 1700.0 parts of this mixture was reverse-thinned into 1339.9 parts of agitated deionized water. An additional 320.0 parts of deionized water was added to yield a homogeneous dispersion which evidenced a solids content of 41.9 (should this be theoretical 38%) % after 1 hour at 110° C.

| The electrodeposition bath was prepared as follows: | |
|---|---|
| Ingredients | Parts by Weight |
| Resin II Phosphated epoxy resin dispersion | 1347 |
| Ethylene glycol monohexyl ether | 39 |
| Eastman Optifilm 400 | 24 |
| Tetronic 150R1 | 0.6 |
| Pigment paste[1] | 304 |
| Deionized water | 1886 |

[1]Grey pigment paste, ACPP-1120, available from PPG Industries, Inc., 50% solids.

The above ingredients were thoroughly blended to produce a resinous blend having a solids content of 20% with a pigment/binder ratio of 0.2.

Bath Composition Used in Example III

Resin III: Phosphated Epoxy Resin Dispersion Preparation

A mixture of 794.7 parts of bisphenol A diglycidyl ether (EEW 188), 255.6 parts of bisphenol A, 112.9 parts of 2-n-butoxy-1-ethanol and 90.3 parts 2-ethyl-1-hexanol was heated to 115° C. At that point, 0.8 parts of ethyl triphenylphosphonium iodide was added. This mixture was heated and held at a temperature of at least 165° C. for one hour. As the mixture was allowed to cool to 90° C., 109.9 parts of EKTASOLVE EEH solvent and 22.5 parts of 2-ethyl-1-hexanol were added. At 88° C., 18.1 parts Praseodymium oxide, available from ESPI, was added followed by 37.9 parts of 85% o-phosphoric acid. The reaction mixture was subsequently maintained at a temperature of at least 120° C. for 30 minutes. At that point, the mixture was cooled to 100° C. and 69.4 parts of deionized water was gradually added. Once the water was added, a temperature of about 100° C. was maintained for 2 hours. Then the reaction mixture was cooled to 90° C. and 87.3 parts of diisopropanolamine was added, followed by 400.6 parts of CYMEL 1130. After 30 minutes of mixing, 1700.0 parts of this mixture was reverse-thinned into 1339.9 parts of agitated deionized water. An additional 320.0 parts of deionized water was added to yield a homogeneous dispersion which evidenced a solids content of 42.6 (should this be theoretical 38%) % after 1 hour at 110° C.

| The electrodeposition bath was prepared as follows: | |
|---|---|
| Ingredients | Parts by Weight |
| Resin III Phosphated epoxy resin dispersion | 1347 |
| Ethylene glycol monohexyl ether | 39 |
| Eastman Optifilm 400 | 24 |
| Tetronic 150R1 | 0.6 |
| Pigment paste[1] | 304 |
| Deionized water | 1886 |

[1]Grey pigment paste, ACPP-1120, available from PPG Industries, Inc., 50% solids.

The above ingredients were thoroughly blended to produce a resinous blend having a solids content of 19% with a pigment/binder ratio of 0.2.

Panel Preparation

Alodine Treated Panels

2024-T3 bare aluminum panels were cleaned by immersing in a solution of RIDOLINE 298, an alkaline cleaner available from Henkel Corporation, for two minutes at 130° F. After alkaline cleaning, the panels were immersed in tap water rinse for one minute at ambient conditions. The panels were then immersed in an solution of DEOXIDIZER 6/16, an acidic deoxidizer available from Henkel Corporation, for two minutes and thirty seconds at ambient conditions. After the acid deoxidation, the panels were immersed in tap water for one minute at ambient conditions. The panels were then immersed in ALODINE 1200S, a conversion coating available from Henkel Corporation, for two minutes and thirty seconds at ambient conditions. The panels were then immersed in deionized water for one minute at ambient conditions followed by a final spray rinse of deionized water. The panels were air dried prior to use.

The panels were then electrocoated in an electrodeposition bath (previously described above) after the bath was subjected to 50% ultrafiltration. The electrodeposition was performed at 90 to 170 volts for 90 seconds at bath temperatures of 24-27° C. After electrodeposition, the panels were all baked at 93° C. (200° F.) for 30 min. in a gas-fired oven. The electrocoated panels were then subjected to ASTM B117 5% neutral salt fog for 3000 hours.

| Test Result Summary | | | |
|---|---|---|---|
| Bath | Pretreatment | Average DFT | Average Total Blister count |
| Example I | Alodine 1200S | 0.85 | 17 |
| Example I + 3000 ppm Benzotriazole[1] | Alodine 1200S | 0.97 | 15 |
| Example II | Alodine 1200S | 0.89 | 17 |
| Example II + 3000 ppm Benzotriazole[1] | Alodine 1200S | 0.61 | 8 |
| Example III | Alodine 1200S | 0.66 | 15 |
| Example III + 3000 ppm Benzotriazole[1] | Alodine 1200S | 0.61 | 11 |

[1]Benzotriazole was post added to each example by dissolving the material in the ethylene glycol monohexyl ether listed for each example. The solution was added to the respective resins prior to the addition of remaining components. Benzotriazole was added such that the final concentration on the total amount of the respective baths was 3000 ppm.

Test results indicated that panels from Example II & III with benzotriazole exhibited improved corrosion performance (i.e., less blistering; face and scribe), less corrosion in the scribe, and less pitting when compared to panels from Example I.

Whereas particular embodiments of this invention have been described above for purposes of illustration, it will be evident to those skilled in the art that numerous variations of the details of the present invention may be made without departing from the invention as defined in the appended claims.

What is claimed is:

1. A process for providing a coating on an aluminum substrate, comprising passing electric current between the substrate acting as an anode and a cathode in electrical contact with an electrodeposition bath to deposit a coating composition comprising an epoxy resin with a lanthanide oxide dispersed therein,
    wherein the electrodeposition bath comprises an aqueous resinous dispersion comprising:
    (a) a base-neutralized ungelled phosphate epoxy resin; and
    (b) the lanthanide oxide comprising a lanthanide series element capable of having a +3 and a +4 oxidation state.

2. The process of claim 1, wherein said lanthanide oxide comprises an oxide of cerium, praseodymium, or terbium.

3. The process of claim 1, wherein said lanthanide oxide comprises at least two oxides of cerium, praseodymium and terbium.

4. The process of claim 1 in which the epoxy resin is selected from a polyglycidyl ether of a polyphenol and an epoxy-functional acrylic resin.

5. The process of claim 1 in which the dispersion additionally comprises a monomeric monoepoxide.

6. The process of claim 1 in which the phosphated epoxy resin has an acid number of 15 to 50 based on resin solids.

7. The process of claim 1 in which the phosphated epoxy resin contains from 0.1 to 0.8 moles of phosphoric acid to one equivalent of epoxy and from 0.01 to 0.4 moles of phosphonic and/or an organophosphinic acid per equivalent of epoxy.

8. The process of claim 7 in which the organophosphonic acid is phenyl phosphonic acid.

9. The process of claim 1 in which the aqueous dispersion further comprises a curing agent.

10. The process of claim 9 in which the curing agent comprises an aminoplast.

11. The process of claim 9 in which (a) the phosphated epoxy resin is present in an amount of 50 to 90 percent by weight and (b) the curing agent is present in an amount of 10 to 50 percent by weight, the percentages being based on total solids weight of (a) and (b).

12. The process of claim 1 in which the aqueous resinous dispersion further comprises an azole.

13. The process of claim 12 in which the azole comprises benzotriazole, 3-mercapto-1,2,4-triazole, 2-mercaptobenzothiazole, 2,5-dimercapto-1,3,4thiadiazole, 1-methylbenzotriazole, or a combination thereof.

14. The process of claim 12 in which the azole is present in the composition in amounts of 0.001 to 1.0 percent by weight, based on total weight of solids in the aqueous resinous dispersion.

15. The process of claim 1, wherein said lanthanide oxide is present in the composition in an amount of 0.015 to 3.2 percent by weight, based on total weight of solids in the aqueous resinous dispersion.

16. A method for coating a substrate comprising:
(a) depositing a conversion coating composition comprising a Group IIIB or Group IVB metal compound onto at least a portion of the substrate; and
(b) electrodepositing a coating composition onto at least a portion of the conversion coating, wherein the coating composition comprises a base-neutralized ungelled phosphated epoxy resin with a lanthanide oxide comprising a lanthanide series element capable of having a +3 and a +4 oxidation state dispersed therein.

17. The method of claim 16, wherein the phosphated epoxy resin comprises a mixture of the reaction product of one or more polymeric epoxy compounds with phosphoric acid and with an organophosphonic acid and/or an organophosphinic acid.

18. An aqueous coating composition, comprising:
(a) a base-neutralized ungelled phosphated epoxy resin; and
(b) a lanthanide oxide comprising a lanthanide series element capable of having a +3 and a +4 oxidation state dispersed in the base-neutralized ungelled phosphate epoxy resin wherein the aqueous coating composition is anodically electrodepositable.

19. A process for providing a coating on an aluminum substrate, comprising passing electric current between the substrate acting as an anode and a cathode in electrical contact with an electrodeposition bath,
wherein the electrodeposition bath comprises an aqueous resinous dispersion comprising:
(a) a base-neutralized ungelled phosphate epoxy resin;
(b) a lanthanide oxide comprising a lanthanide series element capable of having a +3 and a +4 oxidation state; and
(c) an azole.

20. The process of claim 19 in which the azole comprises benzotriazole, 3-mercapto-1,2,4-triazole, 2-mercaptobenzothiazole, 2,5-dimercapto-1,3,4thiadiazole, 1-methylbenzotriazole, or a combination thereof.

21. The process of claim 19 in which the azole is present in the composition in amounts of 0.001 to 1.0 percent by weight, based on total weight of solids in the aqueous resinous dispersion.

22. A process for providing a coating on an aluminum substrate, comprising passing electric current between the substrate acting as an anode and a cathode in electrical contact with an electrodeposition bath,
wherein the electrodeposition bath comprises an aqueous resinous dispersion comprising:
(a) a base-neutralized ungelled phosphate epoxy resin; and
(b) a lanthanide oxide comprising a lanthanide series element capable of having a +3 and a +4 oxidation state.

23. The process of claim 22, wherein said lanthanide oxide comprises an oxide of cerium, praseodymium, or terbium.

24. The process of claim 22, wherein said lanthanide oxide comprises at least two oxides of cerium, praseodymium and terbium.

* * * * *